United States Patent [19]

Leyden

[11] Patent Number: 4,843,497
[45] Date of Patent: Jun. 27, 1989

[54] LEAD SCREW SERVO SYSTEM CONTROLLED BY A CONTROL TRACK

[76] Inventor: Robin D. Leyden, 3387 Denise La., Canoga Park, Calif. 91304

[21] Appl. No.: 17,223

[22] Filed: Feb. 20, 1987

[51] Int. Cl.$^4$ ............................................. G11B 31/00
[52] U.S. Cl. ...................................... 360/79; 369/63; 446/301
[58] Field of Search .................... 360/79, 80, 69, 27; 318/12, 663; 369/63, 64, 69, 70, 51; 446/175, 297–303, 337, 338, 343, 352, 353, 354

[56] References Cited

U.S. PATENT DOCUMENTS

| | | |
|---|---|---|
| 1,920,027 | 7/1933 | Wilhelm . |
| 2,324,774 | 7/1943 | Henry . |
| 2,462,134 | 2/1949 | Scully . |
| 2,847,514 | 8/1958 | Evans ..................... 369/51 |
| 3,199,248 | 8/1965 | Suzuki . |
| 3,287,849 | 11/1966 | Weiss . |
| 3,324,376 | 6/1967 | Hunt . |
| 3,427,745 | 2/1969 | Duffy, Jr. . |
| 3,457,480 | 7/1969 | Angus et al. . |
| 3,471,759 | 10/1969 | Broverman . |
| 3,662,374 | 5/1972 | Harrison et al. . |
| 3,685,200 | 8/1972 | Noll . |
| 3,767,991 | 10/1973 | James . |
| 4,139,968 | 2/1979 | Milner . |
| 4,157,460 | 6/1979 | Bottali et al. ..................... 369/51 |
| 4,207,704 | 6/1980 | Akiyama . |
| 4,231,184 | 11/1980 | Corris et al. . |
| 4,521,205 | 6/1985 | Spector ..................... 446/302 |

FOREIGN PATENT DOCUMENTS

2178584 2/1987 United Kingdom ............... 360/79

Primary Examiner—Alan Faber
Assistant Examiner—Steven R. Garland
Attorney, Agent, or Firm—Harvey S. Hertz

[57] ABSTRACT

A talking and animated doll, toy animal or the like in which speech sounds have simulated muscle movement of eyes, jaws, etc. synchronized thereto. Sound and multiplexed motion control signals are recorded on separate recording medium channels. Sound signals are conventionally detected, amplified and applied to a speaker within the doll. The motion representing signals are digitized and applied to a microprocessor to de-multiplex and provide a plurality of motion signals corresponding to a separate desired motion. These motion signals are each applied to a corresponding servomechanism through a digital-to-analog converter. The servomechanisms each comprise a motor and a driven lead screw having a spiral groove, a carriage having a groove follow, and a thrust rod attached to the carriage to provide an output motion. A linear potentiometer responsive to the position of the carriage provides a servo feedback signal. In a variation, the servo is operated as a velocity servo to simulate the operation of an air cylinder and is responsive to a bi-polar step function control signal. A tachometer coupled to the motor provides the appropriate feedback to maintain servo velocity under varying loading of the thrust rod.

12 Claims, 5 Drawing Sheets

LEAD SCREW SERVO SYSTEM CONTROLLED BY A CONTROL TRACK

BACKGROUND OF THE INVENTION

The invention relates to servomechanism systems and synchronized speech reproduction generally and, more particularly to such systems in which a dual track recording medium provides the speech signals and signal for synchronized simulated muscle motions separately, as in a talking doll or the like.

Various systems for combining visual and audio effects in a doll or other figure have been developed over the years. Of the known pertinent prior art arrangements, attention is drawn to U.S. Pats. Nos. 4,521,205; 3,287,849; 3,685,200; 4,207,704; 4,139,968; 3,199,248; and 3,427,745.

U.S. Pat. No. 4,521,205 describes a sound tape player having animated characteristics. A figure is "animated" in synchronism with sound reproduced from a pre-recorded magnetic tape cassette. Light sources are modulated by the reproduced sound waves in electrical form and the resulting light pulses are directed by light pipes to the eyes and mouth of the figure. No mechanical eye or other motions take place.

U.S. Pat. No. 3,287,849 describes a talking doll having synchronized mouth movement. Sound reproduced from a tape recording is emitted from a speaker and the same electrical signals driving the speaker are used to energize a solenoid connected to effect lip movements.

U.S. Pat. No. 3,685,200 similarly employs a pre-recorded tape cartridge and amplifier from which a speaker emits realistic speech sounds. Electro-magnet means and/or normally operated means are provided to cause doll body member movements relating to the sound from the speaker within.

U.S. Pat. No. 4,207,704 describes a movable member animal model which emits sounds from a speaker within from animal sounds pre-recorded on a tape. The speaker drive signals are also supplied to an audio signal level detector operating electromagnetic and hydraulic drives to open the animal mouth synchronously.

U.S. Pat. No. 4,139,968 discloses a puppet-like apparatus having a movable mouth (lower jaw) and a motor driven mechanical arrangement for opening and closing the mouth. Audio signals above a predetermined level, from either a connected microphone or a radio receiver within the puppet activate the mechanical jaw drive to simulate the type of mouth movements resulting from speech.

In U.S. Pat. No. 3,199,248 there is disclosed a talking parrott figure with microphone electronic circuits, and a loudspeaker within. An endless tape records speech directed to the microphone and is played back in parrott fashion. The reproduced speech from the endless tape is also used to activate a motor driven mechanism for flapping the parotts wings and opening and closing its beak.

Probably the most pertinent item of prior art is U.S. Pat. No. 3,427,745, a drummer toy with various drums "played" by the drummer. That patent discloses the use of a multi-channel magnetic tape. On one channel drum music is recorded and on the other control signals are recorded for programming the movement of the drummers through circuitry and electromagnets. The drum sounds and drummer motions are thereby synchronized.

A technique for controlling a machine tool by pulse-width modulated motor control is shown in U.S. Pat. No. 3,457,480. This technique which is otherwise known per se in the art, affords a method of proportional control applicable as background to that aspect of the combination of the invention.

Recently introduced talking and animated toys include a toy bear having battery powered circuits and servomechanisms for controlling eye and /or mouth movements from signals recorded on a control track of a dual track (stereo) tape cassette. The other track includes synchronized speech, reproduced and emitted by a loudspeaker within the toy bear. Several discretely controlled members, such as the head, eye lids and mouth of the bear are controlled from separable signals on the control track.

In the aforementioned toy bear, miniaturized servomechanisms are employed to act as artificial muscles responsive to the control track signals. These servomechanisms include miniature permanent magnet D.C. motors and are commonly of the type used in radio-controlled model aircraft and the like. Those servomechanisms are commonly identified as RC (radio controlled) servos. They include multiple gear trains to obtain sufficient mechanical advantage to move model aircraft control surfaces against aerodynamic reactive forces. The well known RC servo is relatively expensive to manufacture and assemble.

Speed of movement is not required in the usual RC servo applications, and in fact, fast action may not even by desirable. In the toy bear application, however, the eye, mouth and other movements must be relatively rapid to provide realism. The manner in which a new servomechanism, which is a part of the combination of the invention, improves the state of that aspect of the prior art will described hereinafter.

SUMMARY OF THE INVENTION

In a view of the described state of the prior art, it may be said to have been the general objective of the invention to produce a multi-function servo control system (for the toy bear application, for example) in which the control signals are multiplexed onto one channel of a dual channel (stereo) tape cassette and de-multiplexed for discrete application to each servomechanism corresponding to one of said functions, while synchronized sound is transcribed from the other cassette channel. Thus, the system of the invention is adapted for applications such as in talking and animated toy animals or the like. although its use is not limited thereto.

The pre-recorded control signals are time multiplexed in successive pulse-width modulation cycles, repeating continuously. That is, the control signal for each discrete artificial muscle function (eye blinking, etc.) is one pulse within each of these control pulse cycles and has a pulse width which is variably pre-recorded in accordance with the timing and magnitude which will produce the desired actuation of the corresponding artificial muscle.

The servomechanism for each of the aforementioned aritificial muscle functions is designed for the required miniaturization. Its design is a key element in the novelty of the combination of the invention. In lieu of the typical prior art RC servomechanism, the novel servo includes a servo having a lead screw driven from a miniature permanent magnet type D.C. motor. A carrier block is arranged to translate axially along the length of the leadscrew as the leadscrew rotates, it being coupled to the leadscrew groove by a follower dog. A thrust rod, providing the mechanical output is affixed to the carriage and extends and contracts axially through the housing of the servo package. The required position feedback for servo system operation is provided by a linear potentiometer, the wiper of which travels with the carriage. The electronic circuitry associated with the system responds to the demultiplexed prerecorded control signals and to the linear potentiometer position feedback signal.

The linear potentiometer wiper bridges between a conductive collector strip and the resistance element to provide a tap output at the collector strip without other connections and, accordingly, the other individual parts of the novel servo may be made of non-conductive plastic materials, such as moulded plastics, to minimize manufacturing costs and produce a quiet, fast acting device.

Another embodiment of the servomechanism is constructed to operate as a velocity servo, a configuration which can duplicate, to a significant extent, the on-off type of operation typical of hydraulic or air cylinders.

The manner in which the invention reduces to practice in a typical embodiment within variations will be appreciated from the detailed description hereinafter.

DETAILED DESCRIPTION

Figure 1:
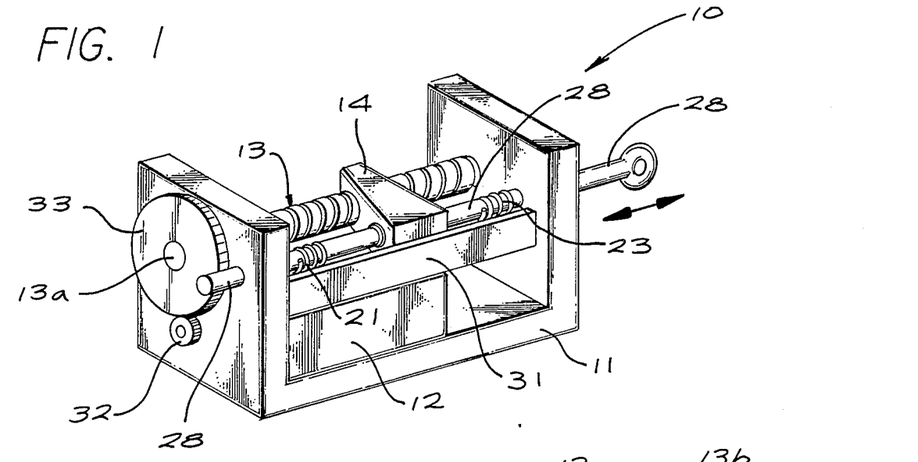
FIG. 1 depicts the basic actuator servo according to the invention in perspective form.
Figure 2:
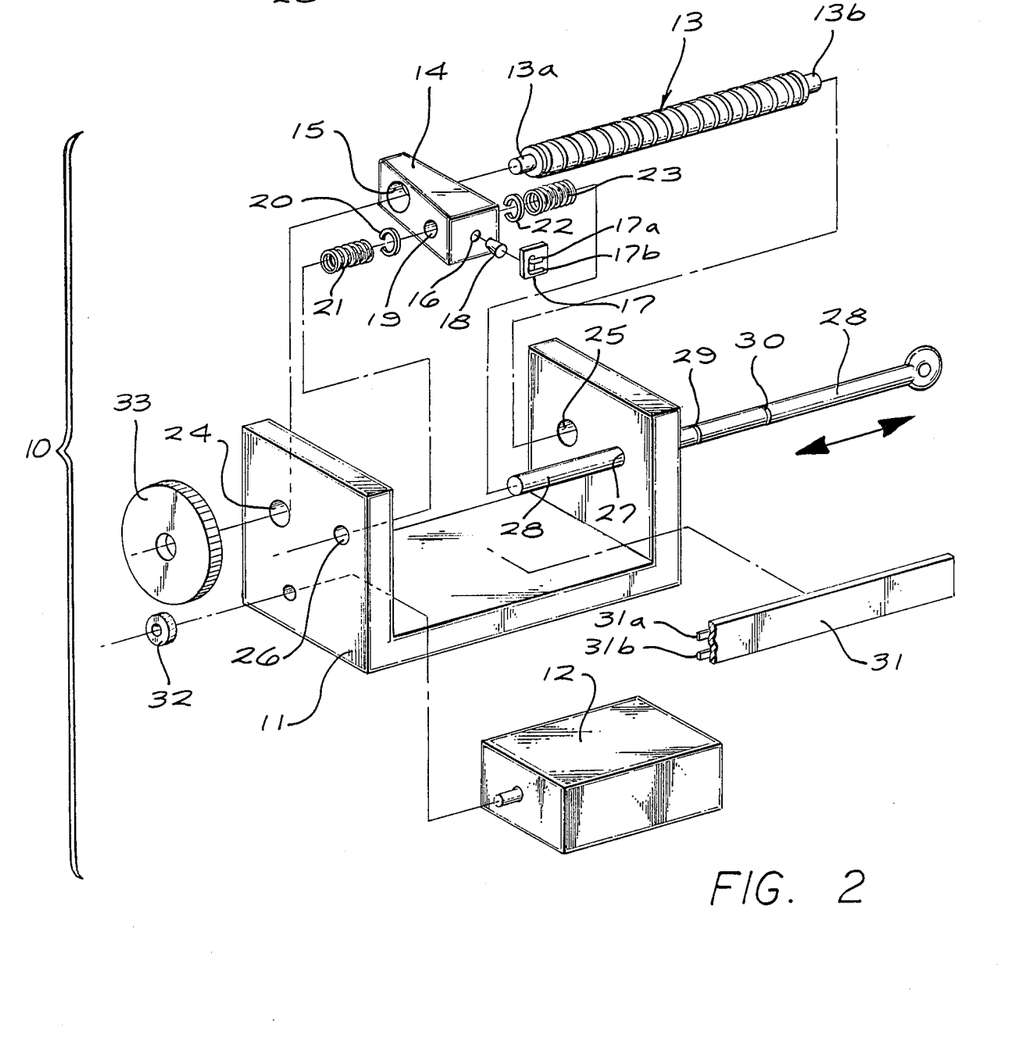
FIG. 2 is an exploded view of FIG. 1.
Figure 3:
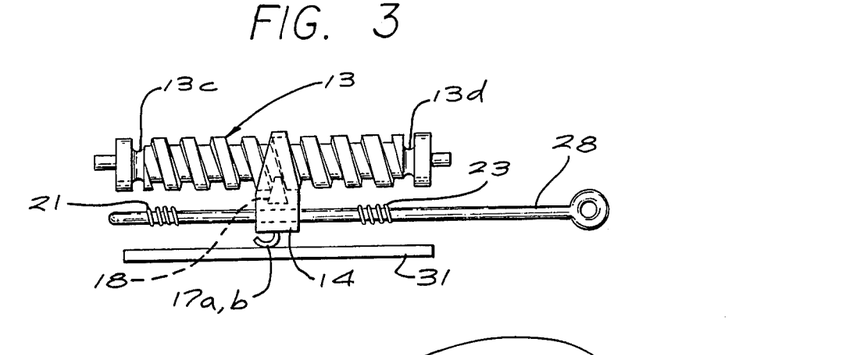
FIG. 3 is a detail of the lead screw subassembly of FIGS. 1 and 2.

Referring now to FIG. 1, the pictorial view of the assembled electromechanical servo-activator 10 will be considered with the exploded view of FIG. 2 of the FIG. 1 device for clarity of detail. The mechanical detail of FIG. 3 is taken from FIG. 1 and will be referred as required to in connection with the FIG. 1 description.

The servo-mechanism of FIGS. 1 and 2 basically operates in response to a control signal (usually a bipolar signal of variable amplitude) to translate the thrust rod 28 to the right or left (as viewed on FIG. 1) in response to a corresponding polarity of this control signal.

A small permanent magnet type D.C. motor 12 is mounted within the cradle-shaped frame 11. The output shaft of motor 12 has a small gear 32 installed thereon. That gear 32 meshes with gear 33 on pressed onto the shaft 13a. Shaft 13a is press-inserted through an axial bore in lead screw 13. The gears 32 and 33 provide for a speed reduction between motor 12 speed and that of lead screw 13, typically on the order of 4:1 and, of course, the motor torgue is correspondingly increased at shaft 13a.

The shaft 13a could be an integral part of lead screw 13 if the frame 11 were not made as a single piece as shown. Making frame 11 of two or three pieces assembled together to form the same frame shape after insertion of lead screw ends 13a through the bearing bores 24 and 25 (see FIG.2).

The bore 15 of a travelling carriage member 14 rides on the outside diameter of lead screw 13, but is coupled to 13 by a plug 18 pressed into a bore 16 so that it engages the spiral groove of 13 and therefore causes travelling carriage 14 to move (right or left on FIG. 1) as lead screw 13 correspondingly rotates. The plug 18 acts as a groove follower dog and is inserted into the position shown in FIG. 3 before thrust rod 28 is inserted through bearing bores 26 and 27 and bore 19 in carriage 14. Although this fit (in bore 19) could be of a press-fit nature, it is more convenient to assemble springs 21 and 23 onto thrust rod 28 in a free fit in bore 19 and attach thrust rod 28 to travelling carriage 14 by means of "C" rings 20 and 22 into grooves 29 and 30 in thrust rod 28. Thrust rod 28 thus translates as carriage 14 is driven by rotation of lead screw 13.

A potentiometer strip 31 includes two parallel conductive strips 31a and 31b. One of these (31a, for example), is a resistance strip and the other (31b) is a uniformly conductive minimum resistance strip. A pair of spring metal wipers 17a and 17b are electrically connected to each other and are affixed to a pad 17 which in turn is attached to the face of carriage 14 over bore 16. If pad 17 is metallic, the interconnection of wiper 17a and 17b is automatically achieved. An electrical connection to either end of conductive strip 17b will be seen to provide a connection to the tap of a potentiometer represented by linear resistive strip 17a. Resistive strip 31a being energized end-to-end by a D.C. source, it then will be realized that a voltage appearing at all points on conductive strip 31b will have a value which is a function of the position of carriage 14 and therefore of thrust rod 28. This voltage may be thought of as the servo feedback signal. The external electrical control circuits will be described in connection with FIGS. 5 through 9.

It will be noted, especially from FIG. 3, that overtravel grooves 13c and 13d are placed at the ends of the spiral grooves of lead screw 13. These grooves permit the dog 18 to assume overtravel end positions while the lead screw 13 continues to rotate. However, when the sense of rotation of (3 is reversed, the corresponding spring (either 21 or 23) urges the carriage 14 and, therefore, the dog 18 again into contact with the spiral grooves for traversal in the opposite direction.

Figure 4:
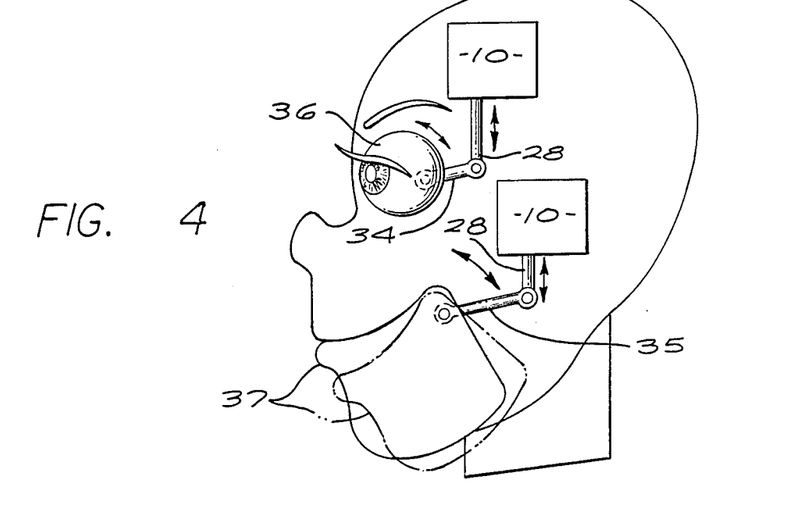
FIG. 4 is a pictorial showing application of actuators according to the invention as artificial or simulated muscles in an animated figure.

A typical use of the actuator of the invention in the head of a talking doll is shown in FIG. 4. Two actuators 10 are employed, each being separately programmed and operated in accordance with electrical circuitry which will be described hereinafter. The purpose of the arrangement of FIG. 4 is to cause the eyes 36 and jaw 37 of the doll head to move appropriately in synchronism with a voice separately provided as will also be described hereinafter. The thrust of rod 28 in each case is coupled to a linkage 34 or 35 to effect the aforementioned eye and jaw movements.

It will be understood that the principles of the invention are applicable to a larger number of life-like movements (head shaking or turning, for example) and the mechanisms may be thought of as electro-mechanical muscles.

The principle uses of the invention, for example, in talking animated dolls and other figures require that overall costs be minimal. Accordingly, fabrication of the apparatus according to FIG. 1 can be accomplished very economically through use of moulded plastic parts. Of course, a few of the parts are preferably metal, such as springs 21 and 23, thrust rod 28, "C" washers 20 and 22 and, of course, the wipers 17a and 17c. The selection of materials may be readily accomplished by those of ordinary skill in this art.

An important ancillary feature of the apparatus of the invention stems from the fact that the position of the thrust rod 28 remains in position when motor 12 is not energized. Ordinary RC servos tend not to remain in position and may be manually moved about inadvertently or by mechanical reactions. The stability of the combination of the invention is due largely to the lead screw and follower dog combination which resists displacement of the thrust rod 28 when the motor 12 is not energized.

Figure 8:
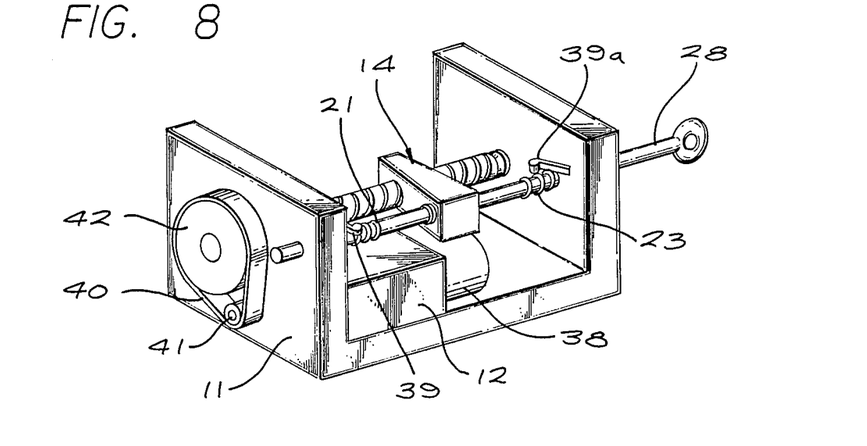
FIG. 8 shows the velocity servo form of artificial muscle actuator simulating air or hydraulic cylinder operation.

Referring ahead to FIG. 8, a version of the servomechanism is shown for velocity servo operation from a step function control signal. For this purpose, a tachometer 38 is coupled to motor 12 and limit switches 39 and 39a are incorporated. The circuitry cooperating with this configuration will be described hereinafter, and subsequently the utility and operation of the FIG. 8 apparatus will be understood.

FIG. 8 also incorporates a belt and pully drive in lieu of gears 32 and 33 in the FIG. 1 version. The belt drive comprises peully 41, belt 40 and pully 42 providing a similar speed reduction to that contemplated by the gear ratio of 32 to 33 in FIG. 1. This belt drive can be used in the FIG. 1 embodiment as well.

In the velocity servo form, the linear potentiometer formed by strip 31 and wipers 17a and 17b is not employed, the feedback signal being supplied by tachometer 38.

Figure 5:
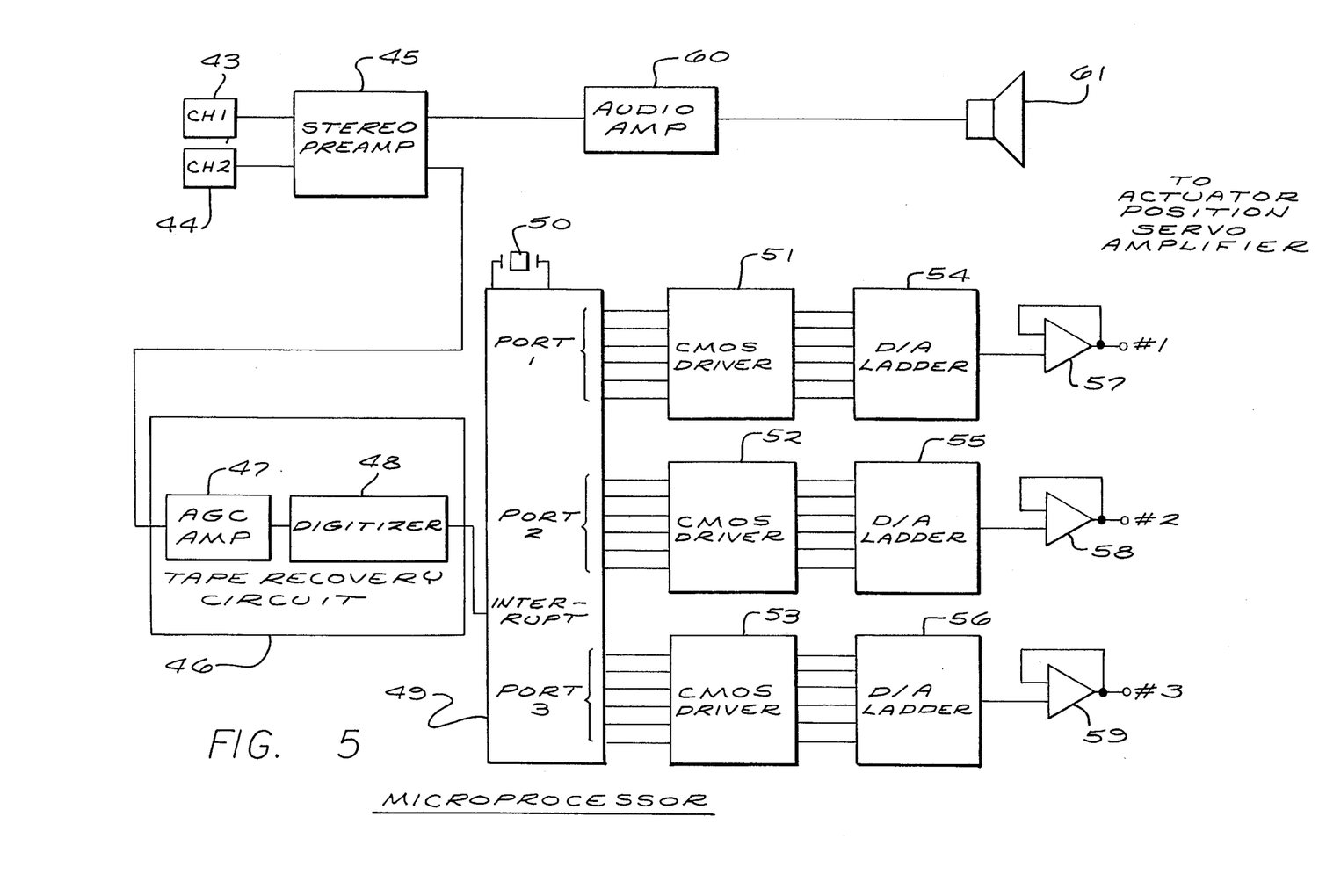
FIG. 5 is a circuit block diagram of a typical control and sound reproduction system, for example, in the animated figure of FIG. 4.

Referring now to FIG. 5, typical circuits for tape signal recovery and control signal de-multiplexing are depicted in block diagram form. Block 43 and 44 represents sound and control signal channel pre-recorded tracks, on a conventional dual track (stereo) tape cassette, respectively. These tracks are conventionally played back and pre-amplified in block 45. The sound signal is conventionally power amplified in block 60, an LM 384 chip, for example, and applied to speaker 61, the latter being concealed within the toy figure.

The control signal output is applied to tape recovery circuit 46. In block 46, the servo control signals are amplitude regulated in circuit 47 and digitized in block 48, which produces a digital code sequence corresponding to the pulse widths of the recovered servo control signals aforementioned. These codes are then applied to the interrupt terminal of a conventional microprocess chip (type 8048 for example). Microchip designation of various parts will be understood to be industry standard designations. The microprocessor 44 operates at a relatively high basic frequency (clock rate) of 10 MHz, for example, controlled by crystal 50.

Within microprocessor 49, the trailing edge of each pulse width modulated control signal from tape track 44 and extant at the output of 47 (now in digital form) is recognized by microprocessor 49 and the respective control codes are separated or demultiplexed and outputted at ports 1 through 3. This configuration presumes that there are three control functions, for example, eye blink, mouth movement and one other, such as head shaking or turning, in a toy or model figure. The three output parts of 49 contain the discrete digital codes for those control functions.

From each part of 49, a "CMOS" driver is connected, i.e. 51, 52 and 53 and then to conventional ladder D/A converters, 54, 55 and 56 as shown on FIG. 5. The analog outputs of 54, 55 and 56 are applied to driver amplifiers 57, 58 and 59, respectively, each of these signals being then being applied to a separate servo circuit as shown in FIG. 6.

Figure 6:
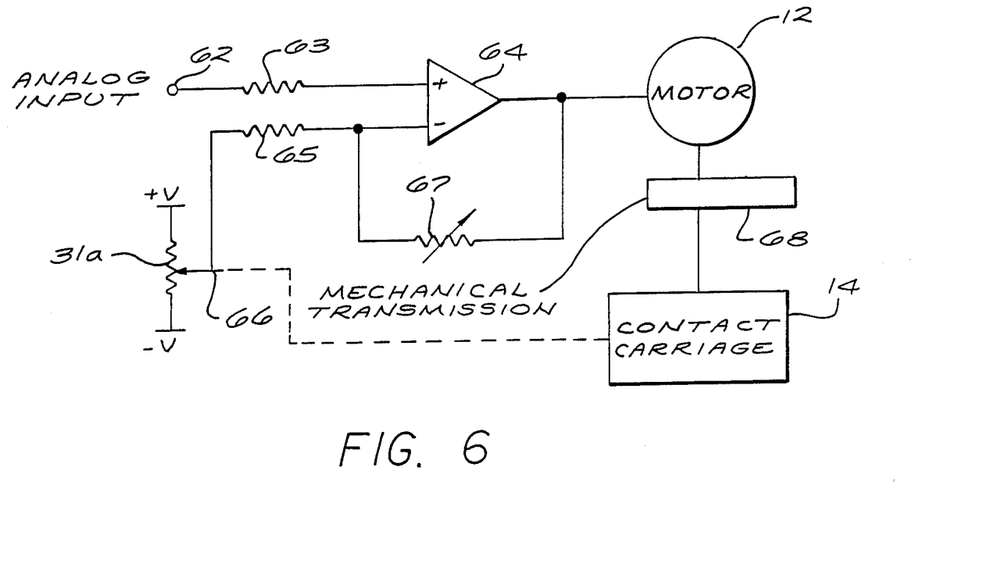
FIG. 6 is a circuit schematic of an analog positioned servo drive as employed in the combination of the invention.

In FIG. 6 the input 62 would be connected to one of the outputs of driver amplifiers 57, 58 or 59 (FIG. 5). The differential amplifier 64 receives the input signal on 62 through resistor 63 and the feedback signal from tap 66 on linear potentiometer 31a (described in connection with FIG. 1) through resistor 65. Accordingly, the drive for motor 12 is either positive or negative and the direction of its rotation corresponds. Variable resistor 67 will be seen to provide gain control in a conventional manner. The tap 66 on linear potentiometer 31a is the same as available on dual wiper 17a and 17b and conductive strip 31b described in connection with FIG. 2. The mechanical transmission 68 shown on FIG. 6 comprises the gears or belt drive and the lead screw 13, and carriage 14 etc., shown and described in connection with FIGS. 1 and 2.

It will be noted that a bipolar power supply source is required for the circuit of FIG. 6 in order that the required rotational reversals of motor 12 can be effected. However, it is possible to configure a circuit using an "H" bridge (common industry designation) whereby only a positive power source polarity is required. Since battery operation is usually required, especially for use such as the animated figure discussed, some economy is provided by use of the "H" bridge circuit of FIG. 7 in lieu of the FIG. 6 circuit.

Figure 7:
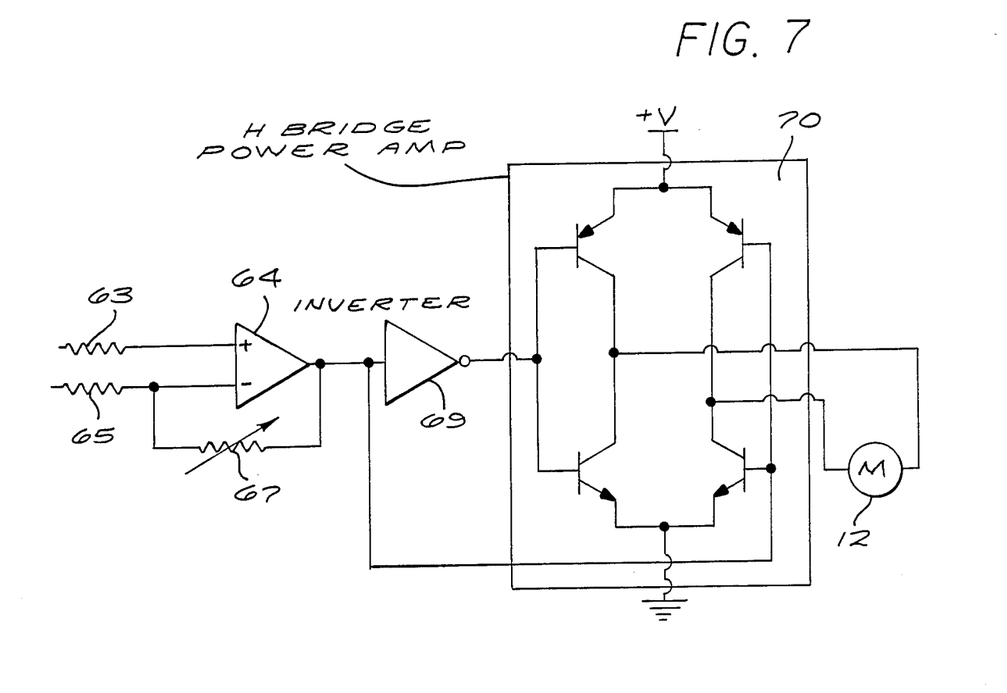
FIG. 7 depicts an "H" bridge servo drive substitute for the circuit of FIG. 6.

In the circuit of FIG. 7, the energization of motor 12 is polarity reversible within the "H" bridge 70. This bridge is connected with an inverter 69 as shown, but all other elements are as in FIG. 6. The open end of resistor 65 in FIG. 7 connects to the position feedback linear potentiometer tap as in FIG. 6.

Referring again to FIG. 8, the belt 48 and pulley drive (41 and 42) has hereinbefore indicated to be an alternative drive coupling from motor 12 to the lead screw 13. The FIG. 8 configuration operates as a velocity servo as contrasted to the position servo configuration of FIGS. 1 and 2. Tachometer 38 and limit switches 39 and 39a will be explained further in connection with FIG. 8, which shows a typical logic circuit for control of the FIG. 8 device.

Figure 9:
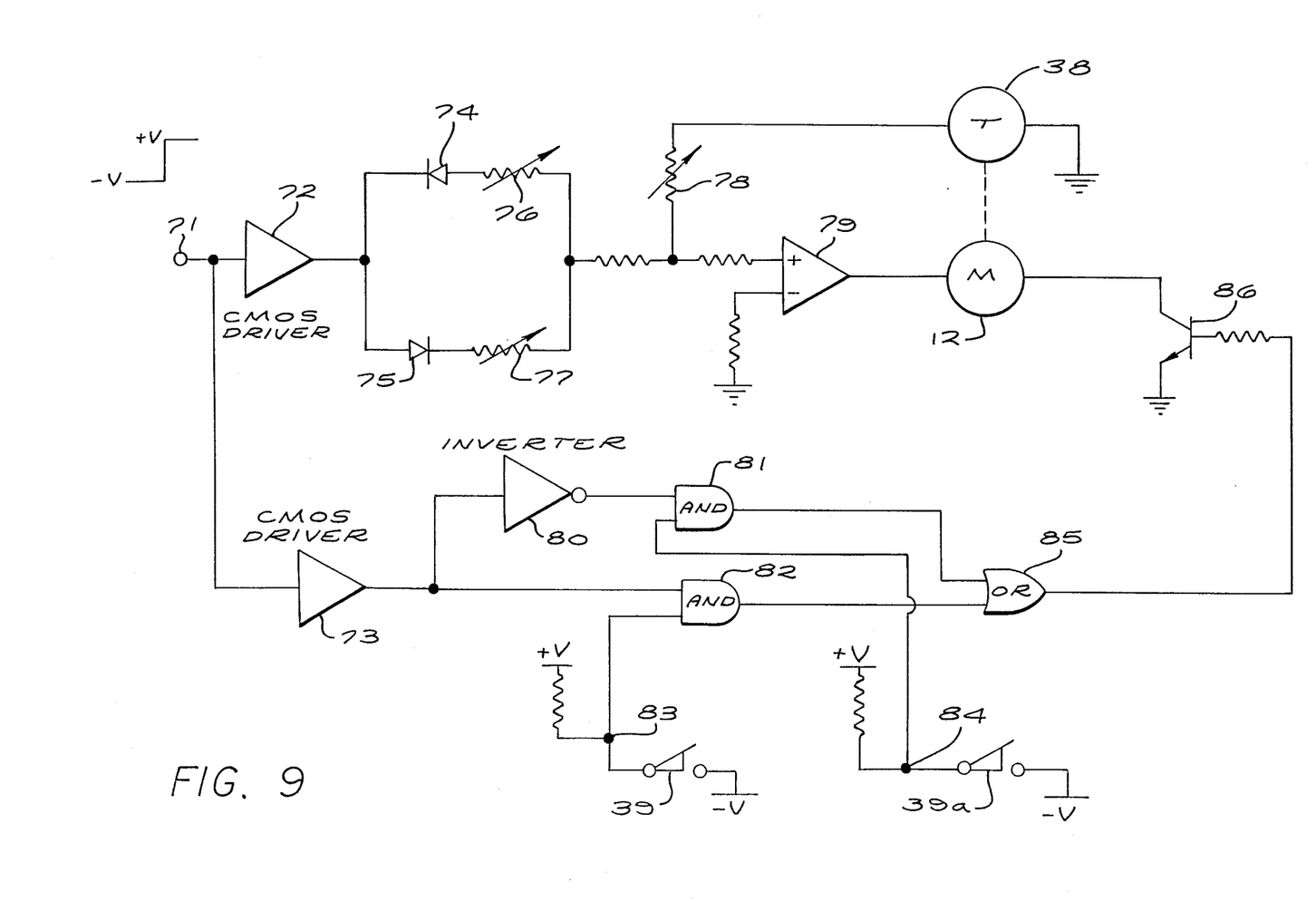
FIG. 9 depicts a typical logic circuitry for operation of the velocity servo system of FIG. 8.

The FIG. 8 device connected in accordance with FIG. 9 will be seen to operate comparably to an air cylinder (on-off, limit to limit) operation. THe input at terminal 71 is a step function signal which has one of two levels, +V or −V. This input signal is applied externally and may be derived from pre-recorded signals as in the FIG. 5 circuit, or may be otherwise applied.

A pair of CMOS drivers 72 and 73 accept this step signal and driver 72 applies it to a forward/reverse circuit comprising diodes 74 and 75 with forward/reverse circuit speed controls (variable resistors) 76 and 77, respectively. A power amplifier 79 receives the output from the junction of variable resistors 76 and 77 and also the output of tachometer 38 via variable resistor 78 as a stability adjustment. Accordingly, the drive to motor 12 is modulated by the tachometer 38 such that variations in load on motor 12 do not significantly affect its speed so that air cylinder operation is more faithfully simulated.

The motor 12 current direction and, therefore, its direction of rotation is detemined by which of the diodes 74 and 75 is conducting (i.e. what the input 71 step polarity is at any time) as well as by the return circuit selection provided through transistor 86 emitter/collector current path. That transistor 86 receiver base control which is ether, +V or −V through the logic circuit represented by inverter 80, AND circuits 81 and 82 and OR circuit 85.

It will be noted that points 83 is at +V when limit switch 39 is open and point 84 is also at +V when limit switch 39a is open. When either of these switches is closed, the corresponding point 83 or 84 is at −V and one of AND circuits 81 and 82 recognizes the + + or − − at its inputs to operate transistor 86 through OR circuit 85 to effectively completes the circuit of motor 12 in the current direction required. Limit switches 39 and 39a are activated by the carriage 14 (FIG. 8) effectively arming the circuit for the next change of step signal input at 71. The carriage remains against the limit switch at either end until a change of input occurs at input 71.

The use of CMOS drivers at 72 and 73 insures that the signals sink current as much as it sources. That is, current pass through drivers 72 and 73 is substantially the same for either polarity of step input 71.

In accordance with the foregoing, it will be seen that life like actuations can be applied to the eyes, mouth and other members of a figure or model, use for which the comination of the invention is particularly adapted. Various modifications of the specific circuits and structures shown and described are possible through exercize of ordinary skill in this art once the invention is understood.

Accordingly, it is not intended that the scope of the invention should be regarded as limited to the specific showings of the drawings or to the description herein. The drawings and description are intended to be typical and illustrative only.

Generically, a speaker or loudspeaker may be any of a number of types and may be referred to as an electric-to-sound transducer, and other generic language is used herein to account for known alternatives for various elements, which perform substantially the same function in the same or an equivalent manner.

Cost of manufacture is a prime consideration in connection with the use of the cobination of the invention in a toy such as an animated, talking, animal figure. Accordingly, maximum use of easily and economically produced plastic parts ia advantageous. The lead screw 13 if made of a suitable plastic will be self lubricating against the follower dog 18. Only minimal mechanical strength and rigidity is required and obviously wide choice of materials is possible.

Circuit variations are also possible, and a person of ordinary skill in the art will reorganize that other circuitry providing the functions described generically could be substituted within the spirit and concept of the novel combination.

I claim:

1. Apparatus for providing at least one linear mechanical movement in response to pre-recorded control signals reproduced from a first recorded track on a magnetic recording medium and sound representing signals recorded on a second track on said recording medium synchronously with respect to said control signals, comprising:

first means for recovering and applying said sound representing signals to an electric-to-sound transducer;

second means for recovering said control signals and for generating corresponding analog control signals; and third means including a servomechanism responsive to said analog control signals, including a motor, means for generating a feedback signal as a function of a performance parameter of said servomechanism and means for comparing said analog and feedback signals and for controlling a motor to achieve said performance parameter, said servomechanism including a spiral grooves lead screw, a thrust rod for outputting a linear motion from said servomechanism, a carriage member having a dog element engaging said spiral groove lead screw, to move said carriage axially along said lead screw in response to rotation of said lead screw, said thrust rod being attached to said carriage to move along with said carriage and said motor being coupled to said lead screw to effect rotation thereof.

2. The combination set forth in claim 1 in which said servomechanism is a position servo and said means for generating a feedback signal is a linear potentiometer responsive to a position of said carriage.

3. The combination according to claim 2 in which said linear potentiometer comprises a generally parallel pair of conductive strips extending axially with respect to said lead screw and arranged for the travel of said carriage to be adjacent to said strips, one of said conductive strips being a linear resistance element and the other being a conductive strips of minimal resistance, and inlcuding a bridging wiper attached to said carriage to continuously connect a tap point along said resistance element to said minimal resistance strip, therein an electrical connection to said minimal resistance strip is tantamount to a connection to said resistance element tap.

4. The combination according to claim 1 in which said analog control signals generated by said second means are D.C. analog signals.

5. The combination according to claim 4 in which said motor is a permanent magnet type which rotates in a direction corresponding to a polarity of energizing D.C. analog signal applied at any time.

6. The combination according to claim 4 in which said pre-recorded control signals comprise a programmed repetitive cycle of a plurality of discrete time separated values each representative of a desired corresponding movement of a mechanically movable element and said second means comprises demultiplexing means responsive to said pre-recorded control signals to generate said analog signals separately, each corresponding to a separate mechanically movable element.

7. The combination according to claim 6 in which said pre-recorded control signals comprise a time separated sequence of pulses, each pulse-width modulated in accordance with a timed program of a desired motion of said corresponding mechanically movable element.

8. The combination according to claim 7 including means responsive to said pre-recorded control signals for generating series of digital codes each representative of the time width of a corresponding one of said pulses in said sequence, said de-multiplexing means includes a microprocessor responsive to said digital codes for separating said codes onto separate microprocessor output ports, and digital-to-analog means are included responsive to each of said microprocessor ports to generate and apply said analog signals to a servomechanism corresponding to a desired mechanical motion.

9. The combination according to claim 4 in which said means for generating a feedback signal is a tachometer and said servomechanism is thereby a velocity servo, said analog signal being a bistatic level signal representative of travel of said carriage to an end of said lead screw corresponding to one of said bistatic levels.

10. The combination according to claim 9 in which limit switches are provided and are arranged to be operated by contact with said carriage, one at each end of carriage travel, and including logical circuits responsive to said bistatic level signal and said limit switches to cause said carriage to move rapidly to contact a corresponding one of said limit switches in response to a corresponding level of said bistatic level signal.

11. The combination according to claim 10 in which said motor is a permanent magnet type which rotates in a direction corresponding to the polarity of said energizing D.C. analog signal.

12. The combination according to claim 11 in which said logical circuits are arranged to detect a closure or opening of either of said limit switches and to reverse a current direction through said motor whenever said bistatic level signal condition corresponds to desired travel of said carriage toward the opposite limit switch.

* * * * *